United States Patent [19]

Horiuchi et al.

[11] Patent Number: 4,772,803

[45] Date of Patent: Sep. 20, 1988

[54] GRADIENT INTENSIFYING SCREEN

[75] Inventors: Hidenaga Horiuchi, Kanagawa; Yuji Aoki, Odawara; Akio Umemoto, Kanagawa, all of Japan

[73] Assignee: Kasei Optonix, Ltd., Tokyo, Japan

[21] Appl. No.: 54,035

[22] Filed: May 22, 1987

Related U.S. Application Data

[63] Continuation of Ser. No. 703,525, Feb. 20, 1985, abandoned.

[30] Foreign Application Priority Data

Feb. 22, 1984 [JP] Japan ................................ 59-30430

[51] Int. Cl.$^4$ ................................ G01J 1/58

[52] U.S. Cl. ................................ 250/487.1; 378/185

[58] Field of Search ................ 250/483.1, 484.1, 487.1; 378/185, 159, 156, 184

[56] References Cited

U.S. PATENT DOCUMENTS

| | | | |
|---|---|---|---|
| 2,820,146 | 1/1958 | Kunes | 250/487.1 |
| 3,665,191 | 5/1972 | Moody | 250/487.1 |
| 4,362,944 | 1/1982 | Sukuzi et al. | 250/483.1 |
| 4,368,390 | 1/1983 | Takahashi et al. | 250/486.1 |

FOREIGN PATENT DOCUMENTS

| | | | |
|---|---|---|---|
| 0021174 | 7/1981 | European Pat. Off. | 250/327.2 |
| 3031267 | 3/1982 | Fed. Rep. of Germany | 250/483.1 |
| 2495818 | 12/1981 | France | 250/327.2 |
| 35-10425 | 5/1960 | Japan | 250/483.1 |
| 56-73400 | 6/1981 | Japan | 250/483.1 |

*Primary Examiner*—Janice A. Howell
*Assistant Examiner*—Richard Hanig
*Attorney, Agent, or Firm*—Oblon, Fisher, Spivak, McClelland & Maier

[57] ABSTRACT

A gradient intensifying screen comprising a support, a fluorescent layer formed on the support and a transparent protective layer formed on the fluorescent layer, characterized in that at least a part of the transparent protective layer is dyed with a dyestuff so that the light transmission of the transparent protective layer is partially varied.

6 Claims, 2 Drawing Sheets

GRADIENT INTENSIFYING SCREEN

This application is a continuation of application Ser. No. 703,525, filed on Feb. 20, 1985, now abandoned.

The present invention relates to an intensifying screen, and more particularly to a gradient intensifying screen.

The intensifying screen is used to fit on an X-ray film (hereinafter referred to simply as "film" ) to improve the speed in a photographic system in various fields including radiography for medical purposes such as X-ray radiography used for medical diagnosis or radiography for industrial purposes such as non-destructive inspection of materials. Basically, the intensifying screen comprises a support such as a paper or plastic sheet, and a fluorescent layer formed on one side of the support. The fluorescent layer is composed of a binder resin and a phosphor dispersed in the binder and is capable of emitting high luminance light when irradiated with radiation. The surface of the fluorescent layer (i.e. the surface of the side opposite to the side facing the support) is usually protected by a transparent protective layer made of e.g. cellulose acetate, polymethacrylate or polyethylene terephthalate. There are some intensifying screens in which a light reflecting layer or a light absorbing layer is interposed between the support and the fluorescent layer. For a radiographic operation, an intensifying screen and a film are brought into close contact with each other so that the fluorescent layer faces the film with the transparent protective layer located inbetween. It is common that intensifying screens are disposed on both surfaces of the film in close contact therewith, and in that state, accommodated in a frame which is commonly called a cassette, and used for radiography.

In the diagnosis of a thoracic disease such as lung cancer by means of chest X-ray radiography in recent years, it is frequently required, for proper diagnosis, to examine not only a lung field but also trachea or bronchus overlaid on the thoracic vertebra or heart. However, in a conventional intensifying screen, the speed is usually uniform over the entire surface, and when the intensifying screen is irradiated with X-rays under the same condition, the amount of the fluorescence emitted from the fluorescent layer is substantially uniform over the entire surface. The speed of the film is also uniform over the entire surface. Accordingly, if simple radiography or tomography of a chest is conducted by means of such a photographic system, it is difficult to simultaneously examine the lung field and the trachea or bronchus overlaid on the thoracic vertebra or heart by a single X-ray photograph. Namely, the X-ray transmission substantially varies among various organs of the chest, and in the X-ray photograph, the film density tends to increase in the order of the thoracic vertebra, the heart and the lung field. The density regions of the photograph are fairly wide. Accordingly, when the radiography is conducted under such an X-ray exposure condition that a film density suitable for the examination of the lung field is obtainable, the film density for the thoracic vertebra and the heart will be inadequate because of the absorption of X-rays by these organs, whereby trachea or bronchus overlaid on these organs can not be observed. Contrary, when the radiography is conducted under such an X-ray exposure condition that a film density suitable for the examination of the trachea or bronchus is obtainable, the film density for the lung field tends to be excessive, and the examination of the lung field becomes impossible.

For the above-mentioned reasons, it has been common to take a plurality of X-ray photographs under various X-ray exposure conditions most suitable to the lung field, and the trachea or bronchus, respectively, so as to obtain photographs having film densities suitable for the lung field, and the trachea or bronchus, respectively, or to conduct the diagnosis of a thoracic disease by examining the chest X-ray photograph in combination with bronchography by means of a contrast medium. However, to take a plurality of X-ray photographs is undesirable because the exposure dose to the patient will thereby be increased. Whereas, the bronchographic X-ray radiography has drawbacks that it is of discomfort to the patient, and it requires time and costs several times as compared with the simple radiography.

In order to solve such problems, it has been proposed to use a gradient intensifying screen i.e. an intensifying screen with a speed partially varied. As such a gradient intensifying screen, there has been proposed a type wherein the speed is complemented by partially varying the thickness of the fluorescent layer, a type wherein the speed is complemented by partially improving the speed by providing a light reflecting layer composed of e.g. a white pigment at such a part between the support and the fluorescent layer, a type wherein the speed is complemented by means of phosphors having different luminance, or a type wherein the speed is complemented by providing a light absorbing layer composed of a coloring agent having a color such as black, blue or red, partially between the support and the fluorescent layer to reduce the speed at such a part. However, the gradient intensifying screens of such types have a drawback that the boundary line between the high speed portion and the low speed portion tends to be distinct because of the technical difficulty in their preparation, whereby in an X-ray photograph taken by means of such intensifying screens, the boundary line where the film density varies abruptly, will appear, which adversely affects the diagnosis. Further, it is not easy to produce gradient intensifying screens of such types to meet desired specifications, and in their mass production, it is not easy to produce a number of products having a uniform quality.

Under these circumstances, it is an object of the present invention to provide a gradient intensifying screen whereby a desired complementary speed can easily be obtained.

It is another object of the present invention to provide a gradient intensifying screen suitable for mass production with a uniform quality.

According to the present invention, the above objects can be attained by dyeing at least a part of the transparent protective layer with a dyestuff so that the light transmission of the transparent protective layer is partially varied. The dyeing can be conducted by immersing an intensifying screen in a dyestuff solution and then taking it out.

Namely, the present invention provides a gradient intensifying screen comprising a support, a fluorescent layer formed on the support and a transparent protective layer formed on the fluorescent layer, characterized in that at least a part of the transparent protective layer is dyed with a dyestuff so that the light transmission of the transparent protective layer is partially varied.

Further, the present invention also provides a process for producing such a gradient intensifying screen, wherein an intensifying screen having a transparent protective layer is immersed in a dyestuff solution and then taken out.

Now, the present invention will be described in detail with reference to the preferred embodiments.

In the accompanying drawings.

Figure 12A:
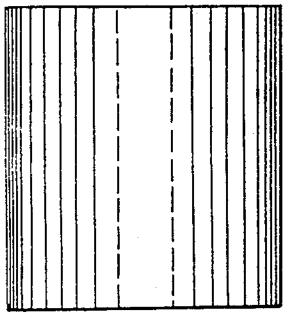
Figure 12B:
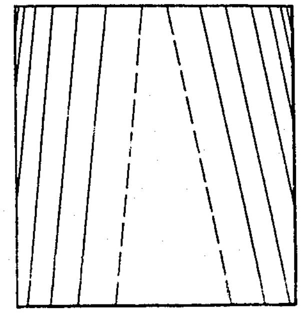

FIGS. 12 (*a*) and (*b*) are plan views of gradient intensifying screens of the present invention.

In the intensifying screen of the present invention, the support and the fluorescent layer may be those which are commonly used in the conventional intensifying screens. As the transparent protective layer in the intensifying screen of the present invention, there may be employed the same protective layer as used in the conventional intensifying screens. Particularly preferred are cellulose acetate, cellulose acetate butyrate, polymethacrylate and polyethylene terephthalate.

As the dyestuff which may be used for the dyeing to have the light transmission of the transparent protective layer varied, there may be mentioned an acid dye, a basic dye or an azo dye. As the acid dye, Naphthol Yellow or Metanil Yellow is particularly preferred. As the basic dye, Methylene Blue or Rhodamine B is particularly preferred. As the azo dye, Methyl Orange is particularly preferred. Two or more dyestuffs may be used in combination. These dyestuffs may be used in the form of a solution having a proper concentration, e.g. an aqueous solution. The dyeing can be conducted simply by immersing an intensifying screen in such a solution. No assisting agent is required, and no boiling for the dyeing is required, whereby no adverse effects will be imparted to the intensifying screen. By using these dyestuffs, the intensifying screen can be dyed to have an adequate density, and it is thereby possible to increase the ratio of the maximum value to the minimum value of the partial light transmittance. For instance, the ratio can be made as high as from 2 to 10. The degree of dyeing is dependent on the temperature and concentration of the dyestuff solution, the immersion time, etc. Accordingly, the immersing time of the transparent protective layer in the dyestuff solution can be partially varied by adequately slowly conducting the immersion of the intensifying screen in the dyestuff solution and the taking it out, whereby the degree of dyeing in the protective layer can be varied.

Figure 1:
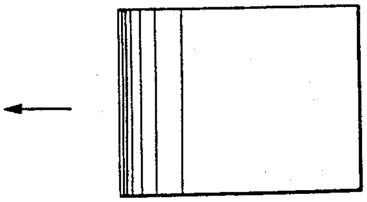
FIGS. 1 to 8 are plan views of various gradient intensifying screens according to the present invention.
Figure 2:
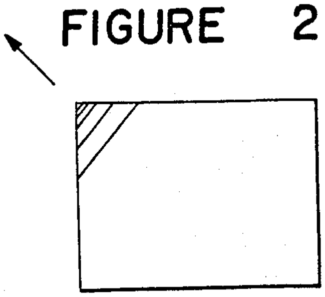
Figure 3:
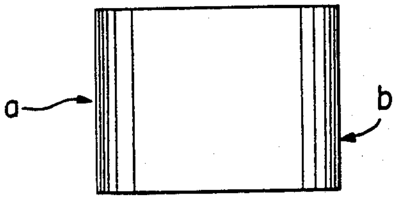
Figure 4:
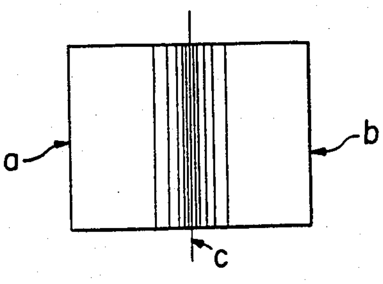
Figure 5:
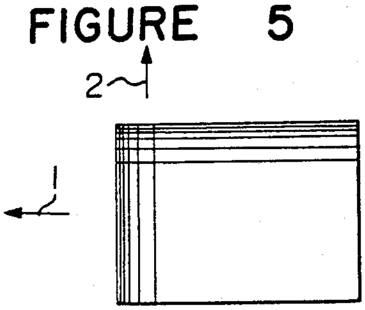
Figure 6:
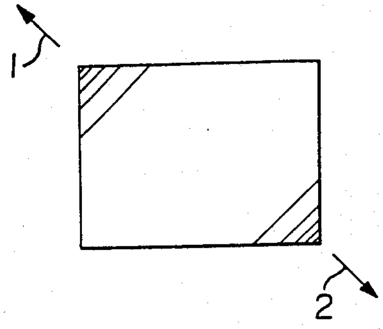
Figure 7:
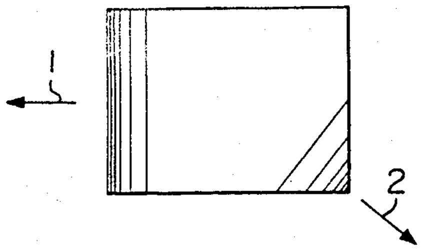
Figure 8:
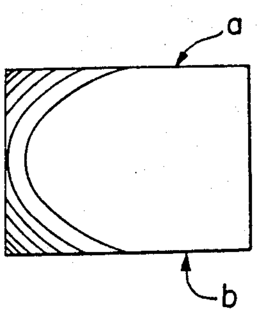
Figure 9:
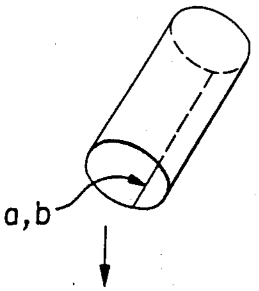
FIG. 9 is a perspective view illustrating an intensifying screen in the process for the preparation.

Specific examples of the gradient intensifying screens of the present invention thus obtained, are shown in FIGS. 1 to 8 in the respective plan views. In these Figures, the rectangular shapes represent the shapes of the intensifying screens, and the degree of dyeing with the dyestuff is represented by the density of the lines within the rectangular shapes. FIGS. 1 and 2 show specific examples in which an intensifying screen is dipped in a dyestuff solution in a flat state to a predetermined depth in the direction as shown by the arrow, and then gradually taken out. The specific example in FIG. 3 is the one obtained by forming an intensifying screen into a cylindrical shape so that sides (a) and (b) of the intensifying screen form a joint portion, then gradually immersing the cylindrical intensifying screen into a dyestuff solution to a predetermined depth with the joint portion located below, and gradually taking it out. The specific example in FIG. 4 is the one obtained by forming an intensifying screen into a cylindrical shape so that its sides (a) and (b) form a joint portion, then gradually immersing the cylindrical intensifying screen into a dyestuff solution to a predetermined depth with the portion of line (c) located below, and gradually taking it up. The specific examples in FIGS. 5 to 7 are those obtained by gradually immersing intensifying screens into a dyestuff solution in a flat state to a predetermined depth in the direction as shown by the arrow 1, gradually taking it up, then gradually immersing the intensifying screens into a dyestuff solution in a flat state to a predetermined depth in the direction indicated by the arrow 2, and then gradually taking it up. The specific example in FIG. 8 is the one obtained by forming an intensifying screen into a cylindrical shape so that its sides (a) and (b) form a joint portion as shown in FIG. 9, gradually immersing the cylindrical intensifying screen into a dyestuff solution to a predetermined depth in the direction of the arrow shown in FIG. 9 (namely the cylindrical shape being inclined), and gradually taking it up.

Other than the above, it is possible to obtain gradient intensifying screens having various patterns with various degrees of the partial dyeing by varying the manner for the deformation of the intensifying screen or by varying the manner of the immersion into the dyestuff solution or the manner of the taking out.

Now, the present invention will be described in further detail with reference to Examples.

However, it should be understood that the present invention is by no means restricted by these specific Examples.

EXAMPLE 1

Figure 10:
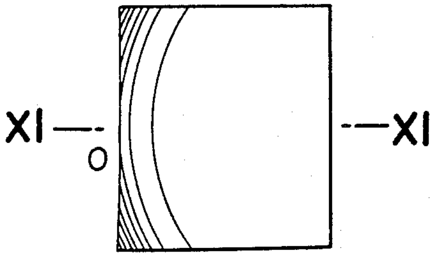
FIG. 10 is a plan view of a gradient intensifying screen of the present invention.
Figure 11:
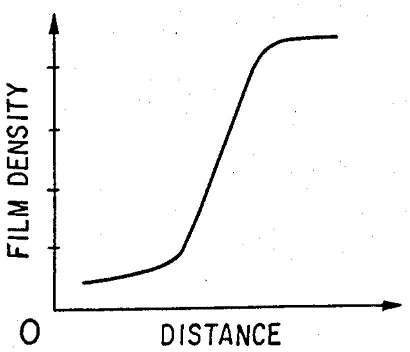
FIG. 11 is a graph showing the film density of an X-ray photograph obtained by means of the intensifying screen of FIG. 10.

A gradient intensifying screen similar to the one shown in FIG. 8 was prepared by using an intensifying screen (size: 200 mm×251 mm) having $CaWO_4$ phosphor coated in an amount of 50 mg/cm$^2$ and a transparent protective layer of cellulose acetate formed thereon and by using Methyl Orange (saturated aqueous solution) as the dyestuff. The plan view is shown in FIG. 10. This gradient intensifying screen has a highly dyed protective layer at the left hand side and a non-dyed protective layer at the right hand side. Accordingly, in this gradient intensifying screen, the intensifying degree is low at the left hand side and high at the right hand side. FIG. 11 shows the X-ray film density (i.e. the intensifying degree) when X-ray radiation was applied uniformly to the radiographic system using this intensifying screen. The values in FIG. 11 were obtained from the measurement along line XI—XI in FIG. 10.

This gradient intensifying screen is useful for cephalometric roentgenography. When the cephalometric roentgenography was conducted under usual conditions with use of this gradient intensifying screen, the skull was photographed with a proper density as in the conventional case, and it was possible to have the soft tissues such as the nose and head photographed distinctly with clear densities. Further, the dyed color strength of the protective layer varied continuously, whereby no boundary line where the film density varied abruptly due to a cause other than the object to be photographed, appeared in the X-ray radiography. Thus, it was possible to examine the X-ray photograph under satisfactory conditions.

EXAMPLE 2

By using the same intensifying screen (size: 353 mm×353 mm) as in Example 1 except that $Gd_2O_2S$:Tb was used as the phosphor instead of $CaWO_4$ and Rhodamine B (saturated aqueous solution) as the dyestuff, the intensifying screen was dyed slightly over the entire surface, and then dyed in the same manner as in FIG. 3 or FIG. 7, to obtain two gradient intensifying screens. Their plan views are shown in FIGS. 12 (*a*) and (*b*). These gradient intensifying screens have highly dyed protective layers at both the left and right hand sides and slightly dyed protective layers at the center portions. Thus, in these gradient intensifying screens, the intensifying degree is low at both the left and right hand sides, and high at the respective center portions.

This gradient intensifying screen is useful for chest radiography. The chest radiography was conducted under usual conditions by using the intensifying screen of FIG. 12 (*a*) for the front side and the intensifying screen of FIG. 12 (*b*) for the back side, whereby both the lung field and the trachea or bronchus overlaid on the thoracic vertebra or heart are photographed distinctly with clear densities. Further, the dyed color strength of the protective layer is varied continuously, whereby no boundary line where the film density changes abruptly due to a cause other than the object to be photographed, will appear in the X-ray photograph. Thus, the examination of the X-ray photograph was conducted under satisfactory conditions.

As discussed in the foregoing, according to the present invention, it is possible to obtain a gradient intensifying screen having an intensifying characteristic of a desired pattern, and it is possible to have the intensifying degree at the boundary between the high speed portion and the low speed portion easily and continuously varied. Accordingly, by means of the gradient intensifying screen of the present invention, it is possible to photograph various portions differing substantially in the X-ray transmission, in a substantially the same density suitable for examination, the entire object can adequately be examined by a single photograph. Further, for example, in the case where a human body is photographed, it is possible to minimize the X-ray exposure dose against the human body.

We claim:

1. A process for producing a gradient intensifying screen comprising a support, a fluorescent layer formed on the support and a transparent protective layer formed on the fluorescent layer, the transmission of said transparent protective layer being partially varied, comprising:

gradually immersing an intensifying screen having a transparent protective layer thereon in a dyestuff solution, and then quickly withdrawing said immersed intensifying screen from said solution, such that immersion time for said transparent protective layer is sufficient to obtain a light transmission which is continuously varied.

2. The process of claim 1, wherein the gradual immersion and quick withdrawal of said intensifying screen is conducted so that the ratio of the maximum value to the minimum value of the partially varied light transmission ranges from 2 to 10.

3. A process for producing a gradient intensifying screen comprising a support, a fluorescent layer formed on the support and a transparent protective layer formed on the fluorescent layer, the transmission of said transparent protective layer being partially varied, comprising:

quickly immersing an intensifying screen having a transparent protective layer in a dyestuff solution, and then gradually withdrawing said immersed intensifying screen from said solution, such that an immersion time for the said transparent protective layer is sufficient to obtain a light transmission which is continuously varied.

4. The process of claim 3, wherein said quick immersion and gradual withdrawal of the intensifying screen is conducted so that the ratio of the maximum value to the minimum value of the partially varied light transmission ranges from 2 to 10.

5. A process for producing a gradient intensifying screen comprising a support, a fluorescent layer formed on the support and a transparent protective layer formed on the fluorescent layer, the transmission of said transparent protective layer being partially varied, comprising:

gradually immersing an intensifying between having a transparent protective layer into a dyestuff solution, and then gradually withdrawing the immersed intensifying screen from said solution, such that an immersion time for the said transparent protective layer is sufficient to obtain a light transmission which is continuously varied.

6. The process of claim 5, wherein the gradual immersion and gradual withdrawal of the intensifying screens is conducted so that the ratio of the maximum value to the minimum value of the partially varied light transmission ranges from 2 to 10.

* * * * *